C. SIMON.
SHOCK ABSORBER.
APPLICATION FILED AUG. 28, 1915.

1,203,421.

Patented Oct. 31, 1916.

WITNESSES

INVENTOR
C. Simon
BY
ATTORNEYS

UNITED STATES PATENT OFFICE.

CHARLES SIMON, OF NEWARK, NEW JERSEY.

SHOCK-ABSORBER.

1,203,421.     Specification of Letters Patent.     Patented Oct. 31, 1916.

Application filed August 28, 1915. Serial No. 47,720.

*To all whom it may concern:*

Be it known that I, CHARLES SIMON, a citizen of the United States, and a resident of Newark, in the county of Essex and State of New Jersey, have invented a new and Improved Shock-Absorber, of which the following is a full, clear, and exact description.

My invention relates to shock absorbers for vehicles, and is intended for coöperation with the vehicle springs.

The invention is characterized by the provision of interpivoted levers connecting one end of the spring to the frame of the vehicle.

The subject matter of this application forms the specific disclosure of a structure broadly covered in my Patent No. 1,163,476, issued December 7, 1915, filed December 29, 1914, under Serial Number 879,485.

The object of the invention is to provide a simple, strong, efficient and inexpensive shock absorber which can be easily and quickly applied to motor vehicles without necessitating alteration to any part of the vehicle.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1:
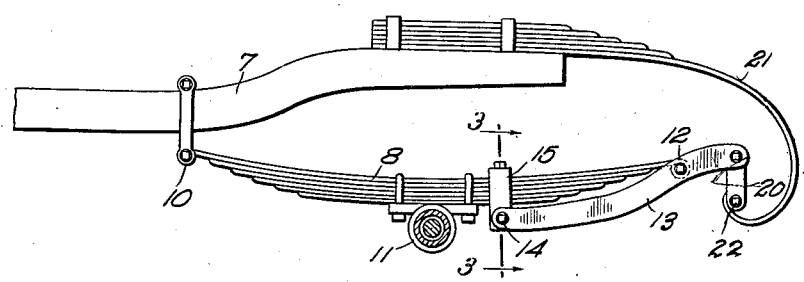
Figure 2:
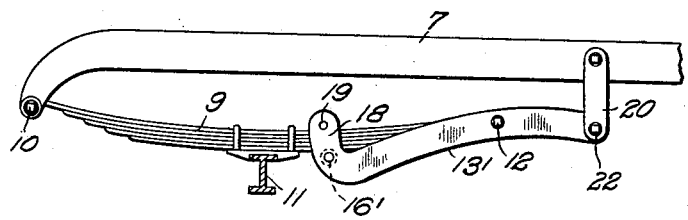
Figure 3:
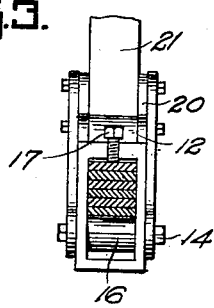

Figure 1 is a side elevation of the rear end of the frame of a vehicle provided with an embodiment of my invention; Fig. 2 is a similar view of the front end of the frame provided with my invention; and Fig. 3 is a section on line 3—3, Fig. 1.

Referring to the drawings, 7 represents the frame of the vehicle body, which is provided with rear and front elliptical springs 8 and 9 respectively. Each of the elliptical springs has one end pivotally connected to the chassis, as shown at 10, the central part of the springs 8 and 9 being secured with their central part on the corresponding running-gear axle 11. The other end of each of the springs 8 and 9 is provided with a pin 12. The pin 12 of the spring 8 engages two levers 13 between their ends disposed to each side of the spring 8. The pin 12 of the spring 9, similarly, engages two levers 13' between their ends and also disposed to each side of the spring. The longer arms of the levers 13 are directed toward the axle 11, and whereat they are secured by means of a pin 14 to a bracket 15. A roller 16 is mounted on the pin 14 and maintained in contact with the spring by means of a set screw 17 provided in the bracket. The bracket 15 connects the ends of the longer arms of the levers 13 to the spring at the axle. The ends of the longer arms of the levers 13' are provided with extensions 18 between which a roller 16' is mounted to contact with the under side of the spring adjacent the axle 11. A pin 19 is also provided connecting the extensions 18 of the levers above the spring, whereby the ends of the levers 13' are connected to the spring adjacent the bearing of the spring. The short arms of the levers 13 and 13' are connected to the frame by links 20. In the rear of the frame the links 20 are connected to a spring 21 which extends from the frame; but where there is no spring extension 21 in the rear, as shown, the link 20 will be directly connected to the frame as shown in Fig. 2.

When the wheels of the vehicle meet an obstacle, the axle and frame of the vehicle will move toward one another. The links 20 will move with the frame, while the ends of the longer arms of the levers will move with the axle toward the chassis, that is to say, the levers will fulcrum on the pin 22 which connects the levers to the links, consequently the pin 12 will move with the spring toward the chassis, and its movement will be proportioned to the relative displacement of the frame to the axle and limited by the distance of the pin 12 from the chassis.

I claim:

1. In combination with a vehicle frame, a running gear, elliptical springs, each having one end thereof in pivotal engagement with the frame and bearing on the running gear between its ends, a rigid lever pivotally connected between its ends to the other end of each spring, one end of said lever being connected to the spring at its bearing, and a link pivotally connected to the other end of the lever and to the frame.

2. In combination with a vehicle frame and a running gear, elliptical springs, each having one end thereof in pivotal engagement with the frame and bearing on the running gear between its ends, and a pair of pivotally connected rigid levers between the other end of each spring and the frame, one of said levers engaging the spring adjacent its bearing on the gear and at the end thereof, the other of said levers being connected to the frame.

3. In a shock absorber for vehicles, a rigid lever adapted to be pivotally connected between its ends to one end of a vehicle spring, means associated with one end of the lever for securing it to the spring, and a link pivotally connected to the other end of the lever and adapted to be attached pivotally to the frame of the vehicle.

In testimony whereof I have signed my name to this specification in the presence of two subscribing witnesses.

CHARLES SIMON.

Witnesses:
JOHN MATTERN,
PATRICK J. O'CONNELL.

Copies of this patent may be obtained for five cents each, by addressing the "Commissioner of Patents, Washington, D. C."